July 10, 1962 W. S. ASTON 3,043,079
CUTTER ARRANGEMENT
Filed Dec. 22, 1959 2 Sheets-Sheet 1

Inventor
WILLIAM S. ASTON
By
Wenderoth, Lind & Ponack
Attorneys

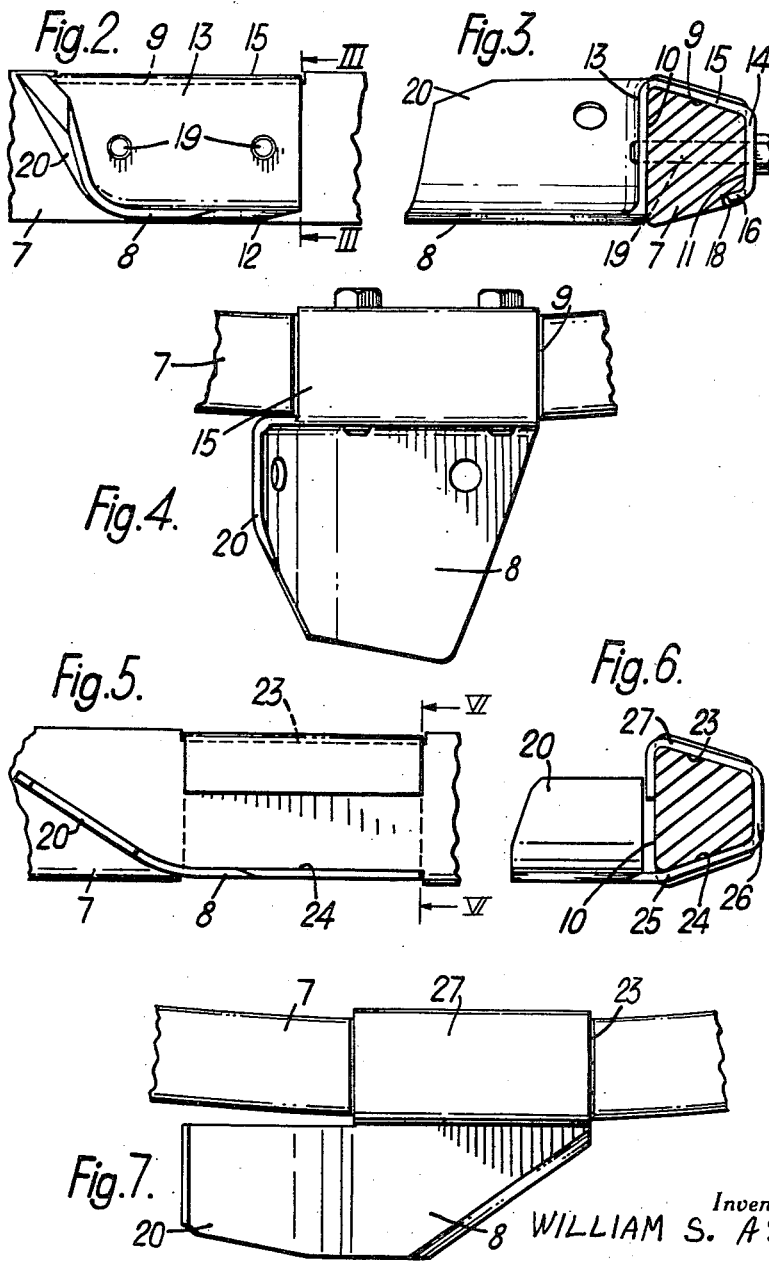

United States Patent Office 3,043,079
Patented July 10, 1962

3,043,079
CUTTER ARRANGEMENT
William Simpson Aston, Jacksbridge Farm,
Lingfield, England
Filed Dec. 22, 1959, Ser. No. 861,397
Claims priority, application Great Britain Apr. 14, 1959
6 Claims. (Cl. 56—290)

This invention relates to a flexible cutting unit for use on an agricultural vehicle or machine such as, for instance, a grass cutting machine, a reaper or a combine harvester.

The main object of this invention is to provide a flexible cutting unit capable of high speed travel, for example, as high as 4,000–10,000 feet per minute without being accompanied by excessive vibration and which is comparatively inexpensive to manufacture and maintain as compared with known cutting arrangements, particularly those employing a rigid reciprocatory bar carrying V-shaped cutting elements.

According to this invention a flexible cutting unit for application to pulleys on a cutting attachment or machine for agricultural use comprises an endless flexible belt of non-metallic material provided with longitudinally spaced recesses or lands in at least one pulley-engaging surface thereof, and a series of cutting elements extending transversely from the outer face of the belt and having belt-attachment members seated in said recesses so that travel of the belt around the pulleys will not be impeded by the cutting elements or their belt-attachment members.

In order that this invention may be more fully understood reference will now be made to the accompanying drawings which illustrate, by way of example, two embodiments of a flexible cutting unit according to this invention.

FIG. 2 is a front elevation, on an enlarged scale of a portion of the flexible cutting unit illustrated in FIG. 1.

FIG. 3 is a side sectional elevation, the section being taken on the line III—III, FIG. 2.

FIG. 4 is a plan view corresponding to FIG. 2.

FIG. 5 is a front elevation of a portion of a modified flexible cutting unit according to this invention.

FIG. 6 is a side sectional elevation, the section being taken on the line VI—VI, FIG. 5 and FIG. 7 is a plan view corresponding to FIG. 5.

Figure 1:
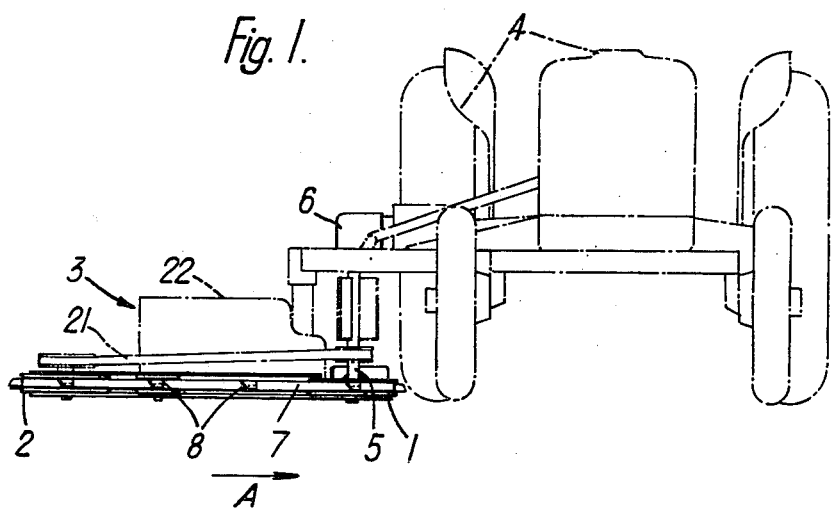
FIG. 1 is a front elevation of an agricultural tractor fitted with a flexible cutting unit according to the invention.

FIG. 1 illustrates a flexible cutting unit according to this invention applied to pulleys 1, 2 of an attachment or structure 3 supported by and to one side of an agricultural tractor 4 shown in dot-and-dash lines. Pulley 1 is mounted on a vertical spindle 5 which is driven in any known manner as, for example, from the tractor engine via bevel gears, not shown, in a housing 6. It is to be understood, however, that the structure 3 may be mounted on or embodied in any desired agricultural machine and that the particular arrangement illustrated in FIG. 1 is given purely by way of example. The mode of mounting the attachment 3 on the tractor need not be described as it forms no part of the present invention. It will be understood, however, that the flexible cutting unit is positioned for horizontal travel at a desired height from the ground and may be used, for example, for cutting field grass in relatively wide bands.

The essential parts of the flexible cutting unit are illustrated in FIG. 1 and comprise a truncated V-shaped rubber or the like endless belt 7 mounted on pulleys 1, 2 and carrying spaced cutting elements 8. The construction of the cutting elements 8 and their manner of attachment to the belt 7 will now be described with reference to FIGS. 2–4 which illustrate one embodiment of this invention.

The references herein to front and rear surfaces of the belt are to be construed as referring to the normal operating position thereof, i.e. as indicated, for example, in FIG. 1. The belt 7 is provided with longitudinally spaced elongated recesses 9 in the top pulley-engaging surface of the belt. The recesses 9 each extend from the front face 10 to the rear face 11 of the belt 7. From Figs. 2 and 3 it will be apparent that the recesses are of substantially rectangular shape. The recesses or lands 9 receive parts of belt-attachment members formed integrally with or connected by welding or otherwise to the cutting elements 8. Each cutting element is in the form of a steel blade having a leading cutting edge 12, as considered with respect to the direction of travel of the belt 7 shown by the arrow A, FIG. 1. The cutting blade extends substantially perpendicularly from the front face 10 of the belt 7, in the example, and is welded to one extremity of an inverted, substantially U-shaped attachment plate comprising limbs 13, 14 and 15. As illustrated more clearly in FIG. 3, the limbs embrace three surfaces of the belt 7, the limb 15 being seated in the recess 9 in which it is snugly accommodated. Limb 14 terminates in a bent end 16 that is accommodated in an elongated corner recess 18 in the rear of the belt 7. The attachment plates may be firmly secured in position by means of screws 19, although these may be dispensed with. Each cutting element 8 terminates at the rear in an upwardly diverted tail or deflector 20. During travel of the belt 7, the grass cut by each cutter is thrown into the air by the trailing deflector 20 so as not to impede the action of the following cutter. If desired, a pulley-driven conveyor belt 21, FIG. 1, may be employed for diverting the cut grass to the side along a deflector plate 22.

The flexible cutting unit hereinbefore described is capable of operation at high speeds, for example, 4000–10,000 feet per minute. The cutting elements and their attachment plates are so shaped and mounted on the belt 7 that there is no risk of their fouling pulleys 1, 2 during travel. The belt 7 is comparatively inexpensive to manufacture, the recesses 9, 18 being moulded or otherwise formed therein. The cutting elements may be readily applied to the belt which is temporarily able to yield in producing engagement between it and the attachment plate by lateral distortion of the belt. The attachment may be performed by unskilled labour without requiring tools, there being an additional advantage that worn or damaged cutters may be replaced without removing the cutting unit from the pulleys. After attachment, the securing screws 19 are applied.

In the modified flexible cutting unit according to FIGS. 5, 6 and 7 cutting elements 8 with rear deflectors 20 are attached to belt 7 as in the first embodiment. The belt 7, however, is provided with longitudinally spaced recesses or lands 23, 24 which extend in both pulley-engaging surfaces of the belt from front to rear thereof. A belt attachment plate is bent to provide three main limbs 25, 26, 27. Limb 25 is seated on land 24, limb 26 engages the rear face 11' of the belt and limb 27 is seated on land 23, as illustrated clearly in FIG. 6. Limb 27 is bent over into engagement with the front face 10' of the belt. The cutting element 8 extends perpendicularly from the belt surface 10' and is welded or otherwise attached to limb 25 of the attachment plate. The provision of the lands 23, 24 enables the limbs 25, 27 to be countersunk in the belt 7 so as to avoid fouling engagement with pulleys 1, 2 during travel of the belt. As this is gripped on four surfaces by the attachment plate, the cutting element 8 is firmly secured to the belt. The attachment plate, illustrated in FIGS. 5–7, involves slightly more trouble in fitting as compared with that illustrated in FIGS. 2–4, since limb 27 has to be bent over when fitting the plate to the belt 7. The attachment plate according to FIGS. 2–4 can be pre-formed since a forced engagement can be produced between it and the belt 7 as above described.

I claim:

1. A cutter assembly for application to V-groove pulleys mounted horizontally on a cutting attachment or machine for agricultural use, said assembly comprising an endless flexible belt of truncated V-shape form, of which at least one pulley-engaging surface has longitudinally spaced, elongated recesses therein extending between the front and rear faces of the belt, and a plurality of cutters carried by said belt, each cutter comprising a cutting blade which projects perpendicularly from the front face of said belt and a belt-attaching portion for substantially embracing said belt, said portion consisting of a plate attached to said blade and bent to form a channel, of which at least one of two opposite limbs is seated in countersunk manner in said recess in at least one pulley-engaging surface of said belt.

2. A cutter assembly according to claim 1, in which a first limb of said channel-shaped plate engages the front face of said belt, a second limb is seated in said recess provided in the top pulley-engaging surface of said belt, and a third limb engages the rear surface of said belt, said first limb being connected to said cutter blade.

3. A cutter assembly according to claim 2, in which said third limb has a bent end and the other pulley engaging face of said belt has a corner recess therein to accommodate said bent end.

4. A cutter assembly according to claim 1, in which said belt has said recesses in both pulley engaging faces and in which a first limb is connected to said cutting blade and is seated in said recess provided in the bottom pulley-engaging surface of said belt, a second limb engages the rear face of said belt, and a third limb is seated in said recess provided in the top pulley-engaging surface of said belt.

5. A cutter assembly according to claim 4, in which said third limb terminates in a bent portion which overlies the top portion of front surface of said belt.

6. A cutter assembly according to claim 1, in which each cutting blade has a rear, upwardly diverted deflector portion, whereby growth cut by each cutter during belt travel is thrown up so as not to interfere with the action of the following cutter.

References Cited in the file of this patent
UNITED STATES PATENTS 2,744,376    Miner                May 8, 1956